3,284,215
WERNER CHROMIUM COMPLEXES AND METHODS FOR THEIR PREPARATION
Adam A. Bartz, Wilmington, Del., assignor to E. I. du Pont de Nemours and Company, Wilmington, Del., a corporation of Delaware
No Drawing. Filed Aug. 5, 1965, Ser. No. 477,582
12 Claims. (Cl. 106—13)

This application is a continuation-in-part of Serial No. 238,000 filed November 15, 1962, now abandoned.

This invention relates to Werner complexes of chromium and monocarboxylic acids and to their preparation.

According to this invention I have discovered a new class of Werner chromium complexes which have remarkable properties.

My new complexes can be applied to the surface of paper and fabrics and dried at ambient conditions to leave a highly water repellent coating. As far as I am aware, no known chrome complex has this useful and commercially significant property. Prior art complexes have required that the drying or curing step be carried out at elevated temperatures of about 212° F. or higher in order to achieve satisfactory water repellency. My complexes can therefore be used in home spray applications to impart a water repellent coating to articles such as clothing, draperies, and the like, without the necessity for the curing step at high temperatures. Elimination of the need for a high-temperature curing step is of course an important advantage also in plant operations. Practical plant-scale application of chromium complexes in water-repellent treatments has heretofore been limited to use with facilities having required curing equipment and large drying capacity. Many paper coaters do not have the necessary drying and curing facilities. Such facilities are not needed when my new complexes are used, thus drastically reducing investment and costs of operation and expanding their use to coaters not equipped with curing facilities.

Another outstanding advantage of my complexes is that they can be neutralized with strong bases to a pH as high as 4½ or 5 without dissociation of the complex or precipitation of solids from solutions of the material. This latter advantage is of course very important for many uses of the complex, such as in the treatment of fabrics where excessive acidity can cause undesired tenderization of the fabric. The ability to be neutralized to such high pH is also of extreme importance to minimize corrosion in situations where the complex is used in contact with materials readily susceptible to corrosion from acidic chemicals, such as occurs with metal coating pans, calender rolls, doctor blades, and similar equipment such as is used in the paper industry.

I have illustrated another remarkable property of my new complexes by applying a 1% aqueous solution adjusted with caustic to pH 5 to half of a pane of glass, freezing the entire pane at 40° below zero C. for one hour, and then removing the pane into ambient conditions. The entire pane frosted over and became opaque. When I ran the frosted pane under tap water, the entire pane cleared. Then, upon removing from under the running tap, the untreated half of the pane promptly frosted over again and completely obstructed vision through that half of the pane. By contrast, the half of the pane that had been treated with my new complex remained clear and transparent indefinitely. This property makes possible the use of my complexes in treating windows of homes, stores and automobiles in winter as agents to allow quick, easy and permanent removal of frost coatings to aid visibility.

THE PRODUCTS OF THE INVENTION

The complexes of this invention are coordination complexes of the Werner type in which a trivalent nuclear chromium atom is coordinated with the carboxylic acido group of an aliphatic monocarboxylic acid having a solubility in water of less than about 0.1% by weight at 20° C.

My complexes are bluish to greenish blue in color. They are completely miscible in all proportions in water and polar organic solvents. The complexes have a basicity of 33⅓%. The ratio of chromium atoms to acido groups in the complexes is in the range from 1:1 to 10:1 and preferably from 2:1 to 5:1.

The complexes are neutralizable with strong base such as sodium hydroxide to a pH as high as 4.5 without dissociation or precipitation of solids.

The complexes of this invention are further characterized by a high degree of polymerization of the chromium atoms and the occupation of substantially all the coordination sites of the chromium atoms with water rather than with alcohol or chloride such as is found in complexes typically prepared in an alcohol matrix.

Each chromium atom, as is well known, has six coordination sites. In the case of a complex prepared with a ratio of chromium to acido groups of 2 to 1 and the complexes prepared from monobasic chromium compound [$(Cr(OH)Cl_2)$], 1 site is occupied by the OH radical from the basic chromic chloride starting material and 1 by an oxygen from the carboxyl group of the organic group. There remains therefore 4 other coordinating sites on the chromium atom. In the case of prior art complexes, these four coordinating sites are filled by either chloride or organic solvent ligands. I have been able to prepare novel complexes where all or a substantial part of these four sites are filled by water molecules or the resulting dissociation product, the hydroxyl group. More specifically, my complexes are distinguishable from any complexes known heretofore in having a ratio of coordinated water to chromium atoms in a range of from at least 2.0:1 up to 4:1.

The term "coordinated water" used herein means either a water molecule or its resulting dissociation product, the hydroxyl group, occupying a coordination site on a chromium atom of the complex. Of course, if water is added such that the ratio of total water to chromium is in excess of 4:1, the excess merely serves as the solvent and hastens the attainment of equilibrium during the preparation and use of the complexes.

Because of the significant amount of water molecules located in the coordination sites of chromium in my complexes, my complexes are characterized by chromium atoms interpolymerized through hydroxyl and oxygen bridges and as a result possess the unique properties discussed above.

Viscosities of the solutions of my complexes are significantly higher than complexes representative of the prior art. For example, a 34% by weight solution of a myristic acid chromium complex of this invention in 57% isopropanol and 9% acetone has a specific gravity at 26° C. of 0.9399 and a viscosity at 30° C. of 8.59 centipoises. A 25.0% by weight solution of the same complex in 68.4% isopropanol and 6.6% acetone has a specific gravity at 26° C. of 0.89 and a viscosity at 30° C. of 4.8 centipoises.

As a further example, a 39.4% by weight solution of a stearic acid chromium complex of my invention in 52.3% isopropanol and 8.3% acetone has a specific gravity at 26° C. of 0.935 and a viscosity at 30° C. of 10.17 centipoises.

Alcoholic solutions of my complexes have their own characteristic ultraviolet and visible as well as infrared absorption spectra. Prior art chromium complexes ordinarily exhibit in the ultraviolet and visible spectra two maxima at about 450 and 625 millimicrons. By contrast my complexes show the two maxima at significantly shorter wave length, as low as 440 and 600 millimicrons and even lower depending on the number of water molecules coordinated with each chromium atom as will be readily understood. In the visible spectrum the high proportion of coordinated water manifests itself with a bluish to greenish blue color compared with the characteristic green color of prior art chromium complexes.

In view of the amount of water present, studies of the infrared absorption spectra of my complexes are difficult. However the spectra of solutions can be determined and further serve to identify and characterize my complexes. For example, a 36.1% by weight solution of a myristic acid chromium complex of the invention in 54.3% isopropanol and 9.6% acetone shows infrared spectra with the following strong bands:

| 5.9 Microns | 7.7 Microns |
| 6.3 Microns | 8.1 Microns |
| 6.5 Microns | 8.2 Microns |
| 6.8 Microns | 8.6 Microns |
| 7.2 Microns | 8.8 Microns |
| 7.4 Microns | 10.5 Microns |

METHOD OF PREPARATION

The complexes of this invention can be made by the steps of (1) reacting, in solution in a monohydric aliphatic alcohol containing not more than 4 carbon atoms, basic chromic chloride and an aliphatic monocarboxylic acid having a solubility in water of less than about 0.1% by weight at 20° C., while excluding water above a maximum allowable amount of 6% by weight based on the total weight of the reaction mass, to form a complex of chromium and the acid, then (2) admixing water to provide in the mass a total of from 8 to about 50% by weight of water based on the total weight of the mass, and (3) heating the resulting aqueous mass at a temperature in the range from about 35° to about 70° C. for a period from about 20 to 75 minutes.

By basic chromic chloride is meant the known chemical $Cr(OH)Cl_2$ which can be produced by conventional methods.

The aliphatic monocarboxylic acids are straight or branched chain saturated fatty acids that are insoluble or very poorly soluble in water. Representative of acids useful to make the complexes of this invention are capric, lauric, palmitic, hendecanoic, tridecanoic, neotridecanoic, myristic, margaric, arachic, stearic and similar monocarboxylic acids. Myristic, palmitic and stearic acids are preferred because of the particularly outstanding stability and performance properties of the resulting complexes. Fatty acids containing as many as 22 carbons or more are satisfactory.

The monohydric aliphatic alcohol which is used as the reaction medium in accordance with the process of my invention should contain not more than 4 carbon atoms. Suitable alcohols include for example methanol, ethanol, n-propanol, isopropanol, n-butanol, sec.-butanol, tert.-butanol and isobutanol. Of these, isopropanol is highly preferred. The alcohol concentration is not critical and for convenience from 1 to 20 parts by weight of alcohol per part of chromic chloride is suitable.

The water content is critical at all times. It is essential up to and including the reaction between the basic chromic chloride and the monocarboxylic acid that the water concentration, including added water as well as water formed in situ, be maintained below 6% and preferably in the range from 3 to 4%. Water present in excess of about 6% at the time of the chromic chloride reaction with the acid for some reason precludes production of my novel complexes.

It is also critical that, following formation of the reaction product of the chromic chloride and the acid, the water content of the mass be adjusted upwardly to within the range from about 8% to about 50% by weight. Preferably the water content will at this time be adjusted below 50% and particularly advantageous results are obtained in the range from 15 to 30%.

Following the adjustment of water concentration as just mentioned, the mass is heated at 35° to 70° C. for 20 to 75 minutes. It will be understood that at the higher temperatures within the prescribed ranges the shorter heating times will be satisfactory and vice versa. This heat treatment is according to this invention important to achieve the outstanding performance characteristics of my complexes. Preferred heat treatment is at about 45° C. for 30 minutes. The product formed in accordance with the above described method of preparation is therefore a composition containing from about 8% to about 50% by weight total water; the novel Werner complex of my invention, having a ratio of coordinated water to chromium atoms from 2:1 up to 4:1; and the remainder of said composition being the organic reaction solvent introduced by step (1) above consisting of a monohydric aliphatic alcohol or mixture of alcohols having 1-4 carbon atoms. It is to be understood, of course, that included with the alcohol or alcohols will be oxidation products thereof resulting from the reduction of chromyl chloride in the presence of said alcohol(s), (e.g., the corresponding ketone(s) of said alcohol or alcohols).

It will be recognized that the essential way in which my process differs from known processes is the critical admixture of water in my process, not before, but after the chromic chloride-acid reaction takes place, followed by the heating step as described.

In a preferred continuous process, the basic chromic chloride used for reaction with the monocarboxylic acid is produced by reduction of anhydrous chromyl chloride with a monohydric aliphatic alcohol. It is therefore convenient to use the resulting solution of basic chromic chloride in the alcohol to continue this invention by admixture with the acid. The anhydrous chromyl chloride in turn could be made by reaction of chromium trioxide, sulfuric acid and hydrochloric acid under substantially anhydrous conditions according to known methods.

The invention will be further understood by reference to the following illustrative examples wherein parts and percentages are by weight unless otherwise indicated.

Example 1

A solution of chromium trioxide in sulfuric acid is made up by adding 400 parts of technical chromium trioxide (99.5%) to an agitated mixture of 2,000 parts of 98% concentrated sulfuric acid and 80 parts of water. Cooling water is circulated around the reactor to maintain the temperature of the chromium trioxide sulfuric acid mixture within the temperature range of about 30 to 60° C. There is then added to the mixture below its surface 1,000 parts of concentrated hydrochloric acid. The temperature of the reaction mixture is kept below 55° C. by external cooling throughout the addition over a 30 minute period.

The reaction mass after adding the hydrochloric acid consists of 2 phases. The heavier layer contains anhydrous chromyl chloride. The lighter phase is composed of sulfuric acid contaminated with chromium and chlorine bearing compounds. The two phases are separated by decantation. Five hundred and ninety-five parts of chromyl chloride are obtained. The chromyl chloride is a limpid blood-red liquid when viewed by transmitted light.

Five hundred and fourteen parts anhydrous chromyl chloride prepared as described above are slowly added below the surface of a refluxing liquid consisting of 1,928 parts of isopropanol. Prior to bringing the isopropanol to reflux, the reactor containing the alcohol is purged with nitrogen and a blanketing action flow initiated. The reduction of the chromyl chloride to basic chromic chloride [Cr(OH)Cl$_2$] by the isopropanol is completed in about 45 minutes. The blanketing nitrogen flow is stopped and the mixture cooled to about 50° C. Three hundred and seventy-nine parts of myristic acid is then added and the resulting mixture heated for a period of 70 minutes at a temperature of 40° C. for complexing.

An additional 180 parts of water are then added and the resulting mixture heated at 40° C. for about 30 minutes. The resulting clear bluish solution of myristato chromic chloride in aqueous ispropanol is stable upon standing and imparts remarkable water repellency to paper treated with it.

This chrome complex solution prepared as described above contains 5.75% chromium and has a total water content of 9% contained in a solvent medium made up of isopropanol and its oxidation products resulting from the reduction of chromyl chloride in its presence. This complex solution is found to be stable against gel formation on prolonged standing. This product has a specific gravity of 0.9399 at 25° C. and viscosity of 8.59 centipoises at 30° C.

A 1% solution of the above chrome complex is prepared by adding 10 parts of the chrome complex solution to 990 parts of water. The pH of the resulting solution is then adjusted to 5.0 using a 4% sodium hydroxide solution.

An 8½ by 11 inch sheet of 42 pound kraft paper is submerged in the above solution for such time that the wet pickup amounts to 75-80%. The sheet is dried until nearly all moisture is removed.

The water repellency of the treated paper as measured by the Continuous Drop Water Repellency Test is in excess of 29,000 seconds. Untreated paper of substantially the same characteristics has a water repellency rating of less than 100 seconds. The water repellency test consists essentially of measuring the time necessary for water fed continuously through a capillary tube with a constant head to form a continuous 6 inch stream on a piece of test paper inclined at 25° from the horizontal.

*Example 2*

One hundred and seventy-one parts of anhydrous chromyl chloride prepared as described in Example 1 is slowly added below the surface of a refluxing liquid consisting of 583 parts of isopropanol. Prior to bringing the isopropanol to reflux, the reactor containing the alcohol is purged with nitrogen and a blanketing nitrogen initiated. The reduction of chromyl chloride to basic chromic chloride by isopropanol is completed in about one hour.

The blanketing nitrogen flow is stopped and the mixture cooled to 50° C. One hundred and twenty-six parts of myristic acid is then added and the resulting mixture heated for a period of 70 minutes at a temperature of 40° C. for complexing.

An additional 120 parts of water is then added and the entire mixture heated at 40° C. for an additional 30 minutes. The resulting clear bluish solution of myristato chrome complex in aqueous isopropanol is stable upon standing and imparts remarkable water repellency to paper treated with it. The paper treated with a 1% solution of this complex as described in Example 1 has a water repellency in excess of 29,000 seconds.

The chrome complex in aqueous isopropanol contains 5.75% chromium and 30% total water. The mol ratio of chromium to myristic acid is 2 to 1.

*Example 3*

One hundred and seventy-nine parts of anhydrous chromyl chloride prepared as described in Example 1 is slowly added below the surface of a refluxing liquid consisting of 539 parts of isopropanol. Prior to bringing the isopropanol to reflux the reactor containing the alcohol is purged with nitrogen and a blanketing nitrogen flow initiated. The reduction of chromyl chloride to basic chromic chloride by the isopropanol is completed in about one hour.

The blanketing nitrogen flow is stopped and the mixture cooled to 50° C. One hundred and sixty-four parts of stearic acid in then added and the resulting mixture heated for a period of 70 minutes at a temperature of about 40° C. for complexing.

An additional 118 parts of water is then added and the mixture heated for 30 minutes at 40° C. The resulting clear greenish blue solution of stearato chromic chloride in aqueous isopropanol is stable against gel formation upon standing and imparts remarkable water repellency to paper treated with it. This chrome complex contains 6% chromium and 15% total water contained in a solvent made up of isopropanol and its oxidation products resulting from the reduction of chromyl chloride in its presence. The mol ratio of chromium to stearic acid is 2 to 1. Paper treated with this stearato chrome complex as described in Example 1 has a water repellency rating in excess of 29,000 seconds.

*Example 4*

One hundred parts of solid basic chromic chloride containing 40.1% chromium and 6.5% water is added to a mixture of 472 parts of isopropanol and 10 parts of water. This mixture is heated to reflux so as to assist in the dissolution of the solid basic chromic chloride. The mixture is cooled and 88 parts of myristic acid are then added and the entire mixture heated for a period of 70 minutes at a temperature of 40° C. for complexing. An additional 48 parts of water is then added and the mixture heated for 30 minutes at 45° C.

The resulting clear greenish blue solution of myristato chromic chloride in aqueous isopropanol is stable against gel formation upon standing. This mixture contains 5.58 chromium, 9.0 total water, 34.3 active ingredients and a mol ratio of water to chromium of 4.65. Paper treated as described in Example 1 with this complex has excellent water repellency characteristics.

The preceding examples are repeated substituting like amounts of capric, palmitic, neotridecanoic and margaric acid respectively for the acid of those examples, with similarly excellent results.

I claim:

1. A composition of a Werner complex, stable against gel formation, having a total water content of from 8 to 50% by weight water, the remainder consisting essentially of (a) a Werner complex having a basic trivalent nuclear chromium atom coordinated with a carboxylic acido group of an aliphatic monocarboxylic acid having a solubility in water less than 0.1% by weight at 20° C. to give a ratio of chromium atoms to acido groups of from 1:1 to 10:1, said complex being further characterized by having a ratio of coordinated water to chromium atoms from at least 2:1 up to 4:1; and (b) a monohydric aliphatic alcohol containing 1 to 4 carbon atoms.

2. A composition as set forth in claim 1 wherein said aliphatic monocarboxylic acid of said Werner complex is lauric acid.

3. A composition as set forth in claim 1 wherein said aliphatic monocarboxylic acid of said Werner complex is myristic acid.

4. A composition as set forth in claim 1 wherein said aliphatic monocarboxylic acid of said Werner complex is palmitic acid.

5. A composition as set forth in claim 1 wherein said aliphatic monocarboxylic acid of said Werner complex is stearic acid.

6. A Werner complex having a basic trivalent nuclear chromium atom coordinated with a carboxylic acido group of an aliphatic monocorboxylic acid having a solubility in water less than 0.1% by weight at 20° C. to give a ratio of chromium atoms to acido groups of from 1:1 to 10:1, said complex being further characterized by having a ratio of coordinated water to chromium atoms from at least 2:1 up to 4:1.

7. In a process of reacting, in solution in a monohydric aliphatic alcohol containing not more than 4 carbon atoms, basic chromic chloride and an aliphatic monocarboxylic acid having a solubility in water of less than about 0.1% by weight at 20° C., the improvements comprising in combination (1) carrying out said reacting while excluding water above a maximum tolerable limit of about 6% by weight based on the total weight of the reaction mass, followed by (2) admixing water with the reaction mass to provide a total water content of from about 8 to 50 weight percent, and (3) heating the resulting admixture at a temperature in the range from about 35° to about 70° C. for a period of about 20 to 75 minutes.

8. Process as set forth in claim 7 wherein said monocarboxylic acid is lauric acid.

9. Process as set forth in claim 7 wherein said monocarboxylic acid is myristic acid.

10. Process as set forth in claim 7 wherein said monocarboxylic acid is palmitic acid.

11. Process as set forth in claim 7 wherein said monocarboxylic acid is stearic acid.

12. Process as set forth in claim 7 wherein said alcohol is isopropanol.

References Cited by the Applicant
UNITED STATES PATENTS 2,273,040   2/1942   Iler.
2,683,156   7/1954   Iler.

CHARLES B. PARKER, *Primary Examiner.*

A. H. SUTTO, *Assistant Examiner.*